(12) United States Patent
Gyotoku

(10) Patent No.: US 9,332,180 B2
(45) Date of Patent: May 3, 2016

(54) IMAGE CAPTURE APPARATUS

(71) Applicant: CANON KABUSHIKI KAISHA, Tokyo (JP)

(72) Inventor: Takashi Gyotoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 14/010,348

(22) Filed: Aug. 26, 2013

(65) Prior Publication Data

US 2013/0342711 A1 Dec. 26, 2013

Related U.S. Application Data

(63) Continuation of application No. PCT/JP2013/060313, filed on Apr. 4, 2013.

(30) Foreign Application Priority Data

Apr. 10, 2012 (JP) .................................. 2012-089689

(51) Int. Cl.
*H04N 5/232* (2006.01)

(52) U.S. Cl.
CPC ....... *H04N 5/23232* (2013.01); *H04N 5/23229* (2013.01); *H04N 5/23293* (2013.01)

(58) Field of Classification Search
CPC ............. G02B 27/0075; G02B 27/146; G02B 27/1066; H04N 13/0235; H04N 5/2258; H04N 5/23232; H04N 5/23229; H04N 5/23293
See application file for complete search history.

(56) References Cited

U.S. PATENT DOCUMENTS

| | | | | |
|---|---|---|---|---|
| 8,754,952 | B2* | 6/2014 | Takagi | H04N 1/00413 348/211.5 |
| 2007/0140579 | A1 | 6/2007 | Miyashita | |
| 2010/0208098 | A1* | 8/2010 | Ogawa | H04N 5/23245 348/223.1 |
| 2011/0037877 | A1* | 2/2011 | Tamaru | H04N 5/23229 348/239 |
| 2012/0038800 | A1* | 2/2012 | Jang | H04N 1/4092 348/252 |

FOREIGN PATENT DOCUMENTS

| | | |
|---|---|---|
| JP | 2003-60980 A | 2/2003 |
| JP | 2007-13475 A | 1/2007 |
| JP | 2007-81685 A | 3/2007 |
| JP | 2007-151189 A | 6/2007 |
| JP | 2010-50635 A | 3/2010 |
| JP | 2011-191340 A | 9/2011 |

* cited by examiner

*Primary Examiner* — Twyler Haskins
*Assistant Examiner* — Peter Chon
(74) *Attorney, Agent, or Firm* — Canon U.S.A., Inc. IP Division

(57) ABSTRACT

An image capture apparatus includes an image capture unit, an image processing unit, an image quality adjusting unit, and an output unit. The image capture unit generates first image data using an image capture device. The image processing unit generates second image data from the first image data so that an image quality of the second image data corresponds to a flat image quality. The image quality adjusting unit converts the second image data into third image data by adjusting the image quality of the second image data to be a predetermined image quality. The output unit outputs the third image data instead of the second image data to an external apparatus if a predetermined condition is satisfied.

29 Claims, 7 Drawing Sheets

IMAGE CAPTURE APPARATUS

CROSS-REFERENCE TO RELATED APPLICATIONS

This application is a Continuation of International Patent Application No. PCT/JP2013/060313, filed Apr. 4, 2013, which claims the benefit of Japanese Patent Application No. 2012-089689, filed Apr. 10, 2012, both of which are hereby incorporated by reference herein in their entirety.

FIELD OF THE INVENTION

The present invention relates to an image capture apparatus and the like which can generate a plurality of image data having different types of image quality.

DESCRIPTION OF THE RELATED ART

Japanese Patent Laid-Open No. 2007-151189 describes an image capture apparatus which has a small display device and which can generate a plurality of image data having different types of image quality.

Currently, regarding an image capture apparatus for business use, there is a demand for generating moving image data whose image quality is suitable for various types of image processing (post processing) performed in a video editing apparatus. One of methods which satisfy such a demand is a method in which image data having a wide dynamic range and having a flat image quality with subdued contrast and sharpness is generated and in which moving image data is generated from the image data. Hereinafter, image data having a wide dynamic range and having a flat image quality with subdued contrast and sharpness is called "flat-image-quality image data".

Flat-image-quality image data is suitable for various types of image processing (post processing) performed in a video editing apparatus, but is viewed as having a flat image quality with subdued contrast and sharpness, and therefore has a problem in that it is not suitable for viewing. Such a problem also arises if flat-image-quality image data is viewed on either of a display device of an image capture apparatus and a display device of an external apparatus.

In addition, a system, in which flat-image-quality image data generated in an image capture apparatus is displayed on a display device of the image capture apparatus, has a problem in that it is difficult to predict how an image quality of the image data is going to change after the image data is applied to a predetermined post processing. Such a problem also arises in a system in which images corresponding to flat-image-quality image data are displayed on a display device of an external apparatus during generation of the flat-image-quality image data in an image capture apparatus.

A system, in which only image data which has not been applied to a predetermined post processing is displayed on a display device of an image capture apparatus or an external apparatus, has a problem in that image data which has been applied to the predetermined post processing cannot be viewed in a moving image shooting mode. Such a problem arises if an image capture apparatus generates flat-image-quality image data in the moving image shooting mode.

A system, in which only image data which has been applied to a predetermined post processing is displayed on a display device of an image capture apparatus or an external apparatus, has a problem in that image data which has not been applied to the predetermined post processing cannot be viewed in a moving image shooting mode. Such a problem arises if an image capture apparatus generates flat-image-quality image data in the moving image shooting mode.

SUMMARY OF THE INVENTION

According to one aspect of the present invention, instead of image data whose image quality is a flat image quality suitable for a predetermined post processing, an image capture apparatus can display image data, whose image quality is obtained by applying the predetermined post processing, on a display device of an external apparatus.

According to one aspect of the present invention, instead of image data whose image quality is a flat image quality suitable for a predetermined post processing, an image capture apparatus can output image data, whose image quality is obtained by applying the predetermined post processing, from the image capture apparatus to the outside.

According to one aspect of the present invention, an image capture apparatus can display, on at least one of a display device of the image capture apparatus and a display device of an external apparatus, image data whose image quality is obtained by applying a predetermined post processing.

According to one aspect of the present invention, an image capture apparatus can select at least one of external output units as an external output unit for outputting, from the image capture apparatus to the outside, image data whose image quality is obtained by applying a predetermined post processing.

According to one aspect of the present invention, an image capture apparatus includes an image capture unit, an image processing unit, an image quality adjusting unit, and an output unit. The image capture unit generates first image data using an image capture device. The image processing unit generates second image data from the first image data so that an image quality of the second image data corresponds to a flat image quality. The image quality adjusting unit converts the second image data into third image data by adjusting the image quality of the second image data to be a predetermined image quality. The output unit outputs the third image data instead of the second image data to an external apparatus if a predetermined condition is satisfied.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Figure 1:
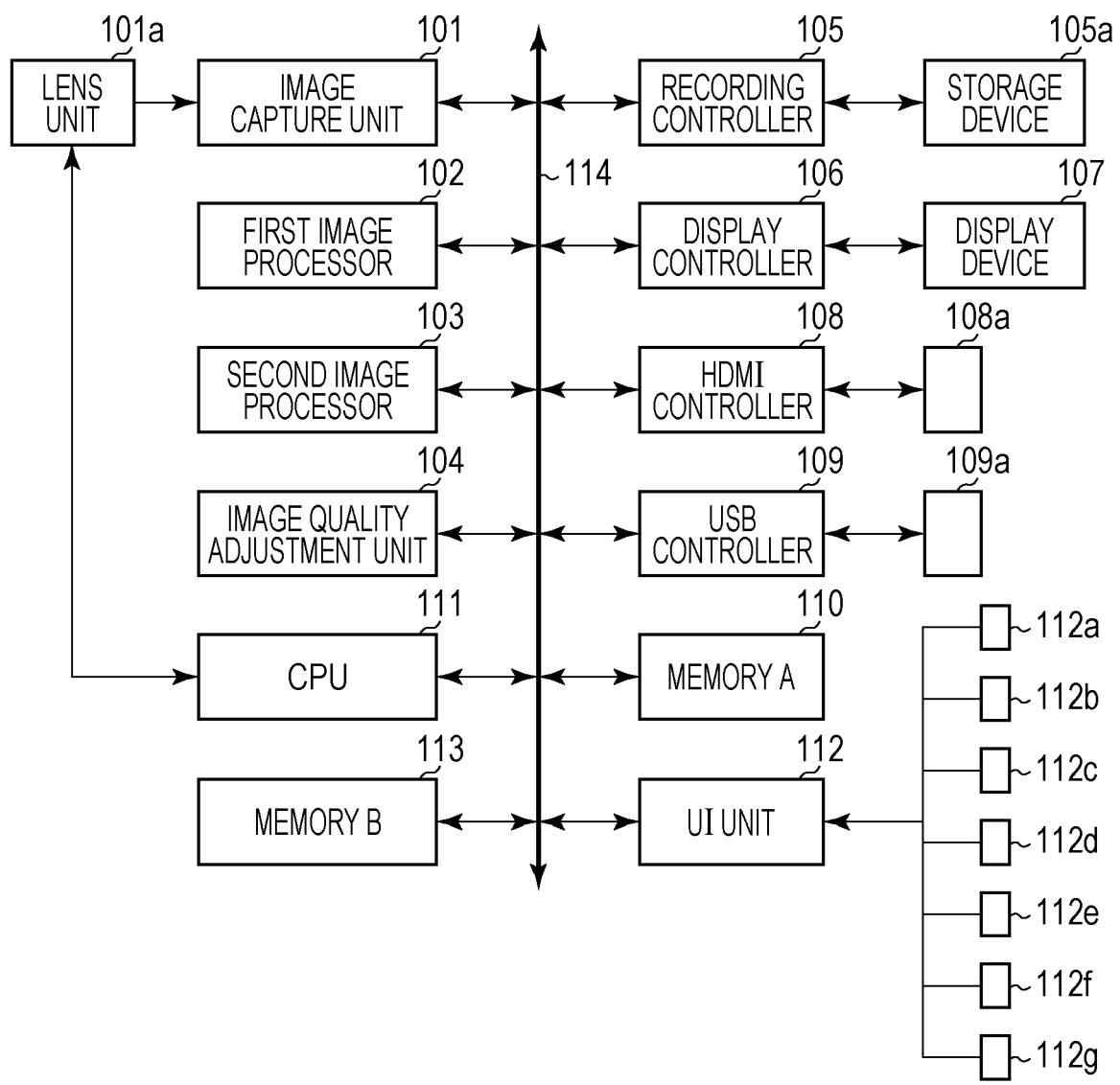
FIG. 1 is a block diagram for illustrating components in an image capture apparatus 100 according to a first exemplary embodiment.

Exemplary embodiments, features, and aspects of the present invention will be described below referring to the drawings, but they are not limited to the exemplary embodiments described below.

First Exemplary Embodiment

Components in an image capture apparatus 100 according to the first exemplary embodiment will be described with reference to FIG. 1. FIG. 1 is a block diagram for illustrating components in the image capture apparatus 100 according to the first exemplary embodiment.

The image capture apparatus 100 may be any apparatus as long as it acts as a digital camera. Therefore, the image capture apparatus 100 may be an apparatus acting as a camera-equipped cell phone. Alternatively, the image capture apparatus 100 may be an apparatus acting as a camera-equipped computer.

The image capture apparatus 100 includes an image capture unit 101, a lens unit 101a, a first image processor 102, a second image processor 103, an image quality adjustment unit 104, a recording controller 105, a display controller 106, and a display device 107.

The image capture apparatus 100 further includes an HDMI controller 108, an HDMI connector 108a, a USB controller 109, a USB connector 109a, a CPU 111, a memory A 110, a UI unit 112, a memory B 113, and an internal bus 114.

The image capture apparatus 100 further includes a power switch 112a, a moving image shooting mode button 112b, a start/stop button 112c, a menu button 112d, a cross button 112e, a setting button 112f, and an information display button 112g.

The image capture unit 101 includes an image capture device for capturing an optical image via the lens unit 101a at each of predetermined time T1 intervals, and an image data generation unit for generating image data having a predetermined format from the optical image captured by the image capture device at each of the predetermined time T1 intervals. Thus, the image capture unit 101 can generate two or more subsequent image data. Hereinafter, image data generated by the image capture unit 101 is called "RAW image data". Each of the RAW image data generated by the image capture unit 101 is supplied from the image capture unit 101 to each of the first image processor 102 and the second image processor 103. The image size (or horizontal and vertical resolutions) of the RAW image data supplied from the image capture unit 101 to each of the first image processor 102 and the second image processor 103 is, for example, equal to or more than "4096×2160". The predetermined time T1 may be either of $1/24$ second, $1/25$ second, $1/30$ second, $1/50$ second, $1/60$ second, $1/120$ second, etc. The lens unit 101a may be removable from the image capture unit 101.

The first image processor 102 can perform various types of image processing including development. The first image processor 102 processes each of the RAW image data supplied from the image capture unit 101 by using image processing parameter information GP1. The image processing parameter information GP1 includes various parameters which can be set by a user. For example, the image processing parameter information GP1 includes parameters for white balance, color interpolation, color correction, gamma conversion, edge enhancement, resolution, and the like. The image processing parameter information GP1 is initialized so that image data having standard image quality is generated. Hereinafter, image data, which is generated by the first image processor 102 processing the RAW image data by using the image processing parameter information GP1, is called "standard-quality image data". The standard-quality image data is image data processed so that the image data is viewed as, for example, an image based on ITU-R BT.709.

The standard-quality image data generated by the first image processor 102 is supplied from the first image processor 102 to each of the recording controller 105, the display controller 106, the HDMI controller 108, and the USB controller 109.

The image size (or horizontal and vertical resolutions) of the standard-quality image data supplied from the first image processor 102 to the recording controller 105 is, for example, either of "4096×2160", "1920×1080", and "1280×720".

The image size (or horizontal and vertical resolutions) of the standard-quality image data supplied from the first image processor 102 to the display controller 106 is, for example, "720×480".

The image size (or horizontal and vertical resolutions) of the standard-quality image data supplied from the first image processor 102 to the HDMI controller 108 is, for example, either of "1920×1080", "1280×720", and "640×480".

The image size (or horizontal and vertical resolutions) of the standard-quality image data supplied from the first image processor 102 to the USB controller 109 is, for example, either of "1920×1080", "1280×720", and "640×480".

The second image processor 103 can perform various types of image processing including development. The second image processor 103 processes each of the RAW image data supplied from the image capture unit 101 by using image processing parameter information GP2 so as to convert each RAW image data into flat-image-quality image data. The image processing parameter information GP2 includes various parameters used to generate the flat-image-quality image data. For example, the image processing parameter information GP2 includes parameters for white balance, color interpolation, color correction, gamma conversion, edge enhancement, resolution, and the like. As described above, the flat-image-quality image data has a wide dynamic range and has an image quality with subdued contrast and sharpness. The flat-image-quality image data is suitable for various types of image processing (post processing) performed in a video editing apparatus as described above.

The flat-image-quality image data generated by the second image processor 103 is supplied from the second image processor 103 to each of the image quality adjustment unit 104, the recording controller 105, the display controller 106, the HDMI controller 108, and the USB controller 109. The first image processor 102 and the second image processor 103 may be formed as two different image processors, or may be formed as a single image processor.

The image size (or horizontal and vertical resolutions) of the flat-image-quality image data supplied from the second image processor 103 to the recording controller 105 is, for example, either of "4096×2160", "1920×1080", and "1280×720".

The image size (or horizontal and vertical resolutions) of the flat-image-quality image data supplied from the second image processor 103 to the image quality adjustment unit 104 is, for example, either of "1920×1080", "1280×720", and "640×480".

The image size (or horizontal and vertical resolutions) of the flat-image-quality image data supplied from the second image processor 103 to the display controller 106 is, for example, "720×480".

The image size (or horizontal and vertical resolutions) of the flat-image-quality image data supplied from the second image processor 103 to the HDMI controller 108 is, for example, either of "1920×1080", "1280×720", and "640×480".

The image size (or horizontal and vertical resolutions) of the flat-image-quality image data supplied from the second image processor 103 to the USB controller 109 is, for example, either of "1920×1080", "1280×720", and "640×480".

The image quality adjustment unit 104 can adjust the image quality of each image data supplied from the second image processor 103 so that the image quality of each image data corresponds to a predetermined image quality. The predetermined image quality is image quality obtained after a predetermined post processing is applied to the flat-image-quality image data. For example, if the predetermined post processing is an image processing for generating an image having a vivid image quality, the predetermined image quality is the vivid image quality. For example, the predetermined image quality may be determined so that the predetermined image quality corresponds to the image quality of image data generated by the first image processor 102. Hereinafter, image data, which is obtained by applying adjustment performed by the image quality adjustment unit 104 so that an image quality of the image data corresponds to the predetermined image quality, is called "image-quality-adjusted image data". In the first exemplary embodiment, description will be made taking, as an example, a case in which the image-quality-adjusted image data is image data adjusted so that the image data is viewed as an image based on ITU-R BT.709.

The predetermined post processing may be selected from multiple types of post processing by a user. In this case, the CPU 111 transmits information indicating image quality corresponding to the post processing selected by the user to the image quality adjustment unit 104. The image quality adjustment unit 104, which receives this information, adjusts the image quality of each image data supplied from the second image processor 103 so that the image quality of each image data corresponds to the image quality corresponding to the post processing selected by the user.

The image-quality-adjusted image data generated by the image quality adjustment unit 104 is supplied from the image quality adjustment unit 104 to each of the display controller 106, the HDMI controller 108, and the USB controller 109.

The image size (or horizontal and vertical resolutions) of the image-quality-adjusted image data supplied from the image quality adjustment unit 104 to the HDMI controller 108 is, for example, either of "1920×1080", "1280×720", and "640×480".

The image size (or horizontal and vertical resolutions) of the image-quality-adjusted image data supplied from the image quality adjustment unit 104 to the USB controller 109 is, for example, either of "1920×1080", "1280×720", and "640×480".

A storage device 105a is a storage device having a flash memory, a memory card, a hard disk drive, or the like, and acts as a recording medium. The storage device 105a may be a storage device removable from the image capture apparatus 100, or may be a storage device embedded in the image capture apparatus 100.

The recording controller 105 has a first function of recording image data, which are supplied from the first image processor 102, in the storage device 105a as moving image data. The first function enables the recording controller 105 to record the standard-quality image data as moving image data in the storage device 105a.

The recording controller 105 also has a second function of recording image data, which are supplied from the second image processor 103, in the storage device 105a as moving image data. The second function enables the recording controller 105 to record the flat-image-quality image data as moving image data in the storage device 105a.

The recording controller 105 has a third function of reading out moving image data specified by a user from the storage device 105a. Each image data included in the moving image data that is read out from the storage device 105a is supplied from the recording controller 105 to the display controller 106, and is displayed on the display device 107.

The display controller 106 has a first function of displaying images, which correspond to image data supplied from the first image processor 102, on the display device 107. The first function enables the display controller 106 to display an image corresponding to the standard-quality image data on the display device 107.

The display controller 106 also has a second function of displaying images, which correspond to image data supplied from the second image processor 103, on the display device 107. The second function enables the display controller 106 to display an image corresponding to the flat-image-quality image data on the display device 107.

The display controller 106 has a third function of displaying images, which correspond to image data supplied from the image quality adjustment unit 104, on the display device 107. The third function enables the display controller 106 to display an image corresponding to the image-quality-adjusted image data on the display device 107.

The display device 107 has, for example, a liquid crystal display device. The display device 107 may be removable from the image capture apparatus 100.

The HDMI controller 108 acts as an external output unit based on the HDMI (High-Definition Multimedia Interface) standard. The HDMI controller 108 has at least one HDMI connector 108a.

The HDMI controller 108 has a first function of outputting image data, which are supplied from the first image processor 102, to an external apparatus EX1 as moving image data. The first function enables the HDMI controller 108 to transmit the standard-quality image data to the external apparatus EX1.

The HDMI controller 108 also has a second function of outputting image data, which are supplied from the second image processor 103, to the external apparatus EX1 as moving image data. The second function enables the HDMI controller 108 to transmit the flat-image-quality image data to the external apparatus EX1.

The HDMI controller 108 also has a third function of outputting image data, which are supplied from the image quality adjustment unit 104, to the external apparatus EX1 as moving image data. The third function enables the HDMI controller 108 to transmit the image-quality-adjusted image data to the external apparatus EX1.

The USB controller 109 acts as an external output unit based on the USB (Universal Serial Bus) standard. As the USB standard, USB 2.0, USB 3.0, and the like are known. The USB controller 109 has at least one USB connector 109a.

The USB controller 109 has a first function of outputting image data, which are supplied from the first image processor 102, to an external apparatus EX2 as moving image data. The first function enables the USB controller 109 to transmit the standard-quality image data to the external apparatus EX2.

The USB controller 109 also has a second function of outputting image data, which are supplied from the second image processor 103, to the external apparatus EX2 as moving image data. The second function enables the USB controller 109 to transmit the flat-image-quality image data to the external apparatus EX2.

The USB controller 109 has a third function of outputting image data, which are supplied from the image quality adjustment unit 104, to the external apparatus EX2 as moving image data. The third function enables the USB controller 109 to transmit the image-quality-adjusted image data to the external apparatus EX2.

The memory A 110 stores programs executed by the CPU 111. The programs stored in the memory A 110 include programs Pg1 to Pg5 described below.

The CPU (Central Processing Unit) 111 has a processor for controlling the image capture apparatus 100 by using the programs stored in the memory A 110. The CPU 111 controls the image capture unit 101, the lens unit 101a, the first image processor 102, the second image processor 103, the image quality adjustment unit 104, the recording controller 105, the display controller 106, and the display device 107. The CPU 111 also controls the HDMI controller 108, the HDMI connector 108a, the USB controller 109, the USB connector 109a, the memory A 110, the UI unit 112, and the memory B 113.

The UI (user interface) unit 112 acts as an instruction input unit for inputting various instructions from a user to the CPU 111. The UI unit 112 has switches, buttons, a touch panel, and the like for receiving various instructions from a user. The UI unit 112 includes the power switch 112a, the moving image shooting mode button 112b, the start/stop button 112c, the menu button 112d, the cross button 112e, the setting button 112f, and the information display button 112g.

The power switch 112a is a switch for controlling power supply of the image capture apparatus 100. If the power switch 112a is turned ON, the CPU 111 causes the image capture apparatus 100 to enter a power-on mode. If the power switch 112a is turned OFF, the CPU 111 causes the image capture apparatus 100 to enter a power-off mode or a power saving mode.

The moving image shooting mode button 112b is a button for instructing the CPU 111 to start or stop the moving image shooting mode. The moving image shooting mode is one of the operation modes in the image capture apparatus 100. The start/stop button 112c is a button for instructing the CPU 111 to start or stop moving image recording.

Figure 6:
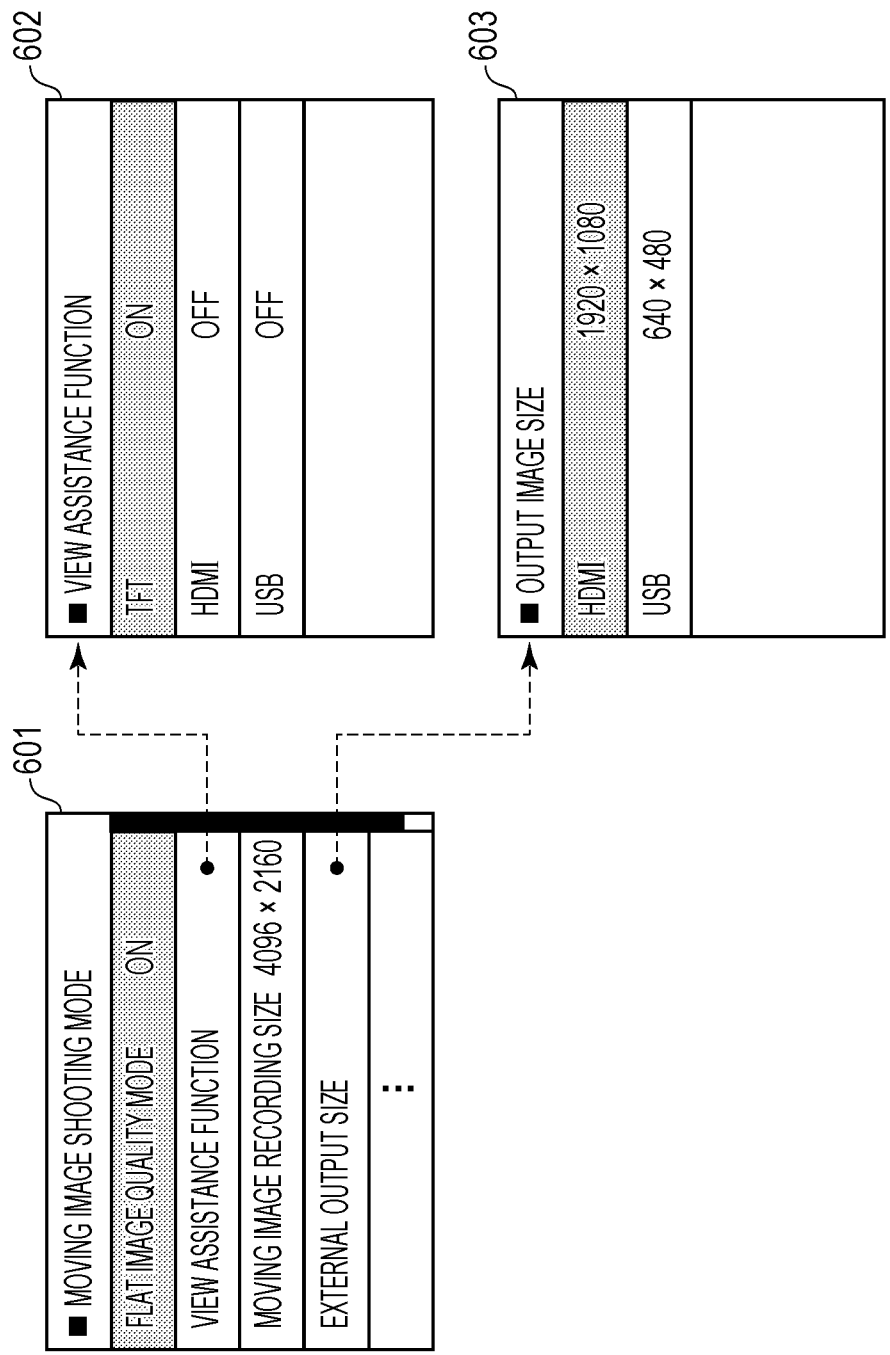
FIG. 6 is a diagram for illustrating exemplary setting menus in the image capture apparatus 100 according to the first exemplary embodiment.

The menu button 112d is a button for instructing the CPU 111 whether or not a setting menu 601 illustrated in FIG. 6 is to be displayed on the display device 107. If the menu button 112d is turned ON, the CPU 111 causes the setting menu 601 illustrated in FIG. 6 to be displayed on the display device 107. If the menu button 112d is turned OFF, the CPU 111 causes the setting menu 601 and setting menus 602 and 603 illustrated in FIG. 6 not to be displayed on the display device 107.

The cross button 112e is a button for operating the setting menus 601 to 603 illustrated in FIG. 6. The setting button 112f is a button for setting an item selected by a user to the image capture apparatus 100. The information display button 112g is a button for setting a shooting information adding function to ON or OFF.

The memory B 113 is a memory for storing various types of information. Information indicating whether a flat image quality mode is ON or OFF is stored in the memory B 113. The image processing parameter information GP1 and the image processing parameter information GP2 are stored in the memory B 113. Information about the predetermined post processing is stored in the memory B 113. Initial settings about the image capture apparatus 100 are stored in the memory B 113. The setting menus 601 to 603 and other setting menus displayed on the display device 107 are stored in the memory B 113. Predetermined conditions J1, J2, and J3 described below are stored in the memory B 113. Setting information about the shooting information adding function is stored in the memory B 113.

Exemplary setting menus in the image capture apparatus 100 will be described with reference to FIG. 6.

FIG. 6 is a diagram for illustrating exemplary setting menus in the image capture apparatus 100 according to the first exemplary embodiment. The setting menus 601 to 603 illustrated in FIG. 6 are stored in the memory B 113.

In FIG. 6, the setting menu 601 is a setting menu for changing setting information about the moving image shooting mode.

If the right side of the cross button 112e is pressed when "flat image quality mode" in the setting menu 601 is selected, "ON" or "OFF" is displayed. If the setting button 112f is pressed when "ON" is displayed, the CPU 111 sets the flat image quality mode to ON. If the setting button 112f is pressed when "OFF" is displayed, the CPU 111 sets the flat image quality mode to OFF. In the initial settings, setting information about the flat image quality mode indicates, for example, "OFF". The setting information about the flat image quality mode is stored in the memory B 113.

If the setting button 112f is pressed when "view assistance function" in the setting menu 601 is selected, the CPU 111 causes the setting menu 602 to be displayed on the display device 107. This enables a user to change setting information about view assistance functions.

If the right side of the cross button 112e is pressed when "moving image recording size" in the setting menu 601 is selected, either of, for example, "4096×2160", "1920×1080", and "1280×720" is displayed. In the first exemplary embodiment, image size (or horizontal and vertical resolutions) of image data, which is recorded as moving image data by the recording controller 105 in the storage device 105a, is called a "moving image recording size". If the setting button 112f is pressed when "4096×2160" is displayed, the CPU 111 sets setting information about the moving image recording size to "4096×2160". Through a similar operation, the CPU 111 can set the setting information about the moving image recording size to "1920×1080" or "1280×720". Thus, a user can select "4096×2160", "1920×1080", or "1280×720" as the moving image recording size so as to set it to the image capture apparatus 100. In the initial settings, setting information about the moving image recording size indicates, for example, "4096×2160". The setting information about the moving image recording size is stored in the memory B 113.

If the setting button 112f is pressed when "external output size" in the setting menu 601 is selected, the CPU 111 causes the setting menu 603 to be displayed on the display device 107. This causes a user to change setting information about external output sizes. In the first exemplary embodiment, image size (or horizontal and vertical resolutions) of image data, which is output from the HDMI controller 108 or the USB controller 109 to the external apparatus EX1 or EX2, is called an "external output size".

In FIG. 6, the setting menu 602 is a setting menu for changing setting information about view assistance functions.

In the setting menu 602, "TFT" corresponds to the display device 107. If the right side of the cross button 112e is pressed when "TFT" is selected, "ON" or "OFF" is displayed. If the setting button 112f is pressed when "ON" is displayed, the CPU 111 sets setting information about a view assistance function of the display device 107 to ON. If the setting button 112f is pressed with "OFF" being displayed, the CPU 111 sets the setting information about the view assistance function of the display device 107 to OFF. In the initial settings, the setting information about the view assistance function of the display device 107 indicates, for example, "ON". The setting information about the view assistance function of the display device 107 is stored in the memory B 113.

In the setting menu 602, "HDMI" corresponds to the HDMI controller 108. If the right side of the cross button 112e is pressed when "HDMI" is selected, "ON" or "OFF" is displayed. If the setting button 112f is pressed when "ON" is displayed, the CPU 111 sets setting information about a view assistance function of the HDMI controller 108 to ON. If the setting button 112f is pressed with "OFF" being displayed, the CPU 111 sets the setting information about the view assistance function of the HDMI controller 108 to OFF. In the initial settings, the setting information about the view assistance function of the HDMI controller 108 indicates, for example, "OFF". The setting information about the view assistance function of the HDMI controller 108 is stored in the memory B 113.

In the setting menu 602, "USB" corresponds to the USB controller 109. If the right side of the cross button 112e is pressed when "USB" is selected, "ON" or "OFF" is displayed. If the setting button 112f is pressed when "ON" is displayed, the CPU 111 sets setting information about a view assistance function of the USB controller 109 to ON. If the setting button 112f is pressed with "OFF" being displayed, the CPU 111 sets the setting information about the view assistance function of the USB controller 109 to OFF. In the initial settings, the setting information about the view assistance function of the USB controller 109 indicates, for example, "OFF". The setting information about the view assistance function of the USB controller 109 is stored in the memory B 113.

In FIG. 6, the setting menu 603 is a setting menu for changing setting information about external output sizes.

In the setting menu 603, "HDMI" corresponds to the HDMI controller 108. If the right side of the cross button 112e is pressed when "HDMI" is selected, either of, for example, "1920×1080", "1280×720", and "640×480" is displayed. If the setting button 112f is pressed when "1920×1080" is displayed, the CPU 111 sets setting information about the external output size of the HDMI controller 108 to "1920×1080". Through a similar operation, the CPU 111 can set the setting information about the external output size of the HDMI controller 108 to "1280×720" or "640×480". Thus, a user can select "1920×1080", "1280×720", or "640×480" as the external output size of the HDMI controller 108 so as to set it to the image capture apparatus 100. In the initial settings, the setting information about the external output size of the HDMI controller 108 indicates, for example, "1920×1080". The setting information about the external output size of the HDMI controller 108 is stored in the memory B 113.

In the setting menu 603, "USB" corresponds to the USB controller 109. If the right side of the cross button 112e is pressed when "USB" is selected, either of, for example, "1920×1080", "1280×720", and "640×480" is displayed. If the setting button 112f is pressed when "1920×1080" is displayed, the CPU 111 sets setting information about the external output size of the USB controller 109 to "1920×1080". Through a similar operation, the CPU 111 can set the setting information about the external output size of the USB controller 109 to "1280×720" or "640×480". Thus, a user can select "1920×1080", "1280×720", or "640×480" as the external output size of the USB controller 109 so as to set it to the image capture apparatus 100. In the initial settings, the setting information about the external output size of the USB controller 109 indicates, for example, "640×480". The setting information about the external output size of the USB controller 109 is stored in the memory B 113.

Figure 2:
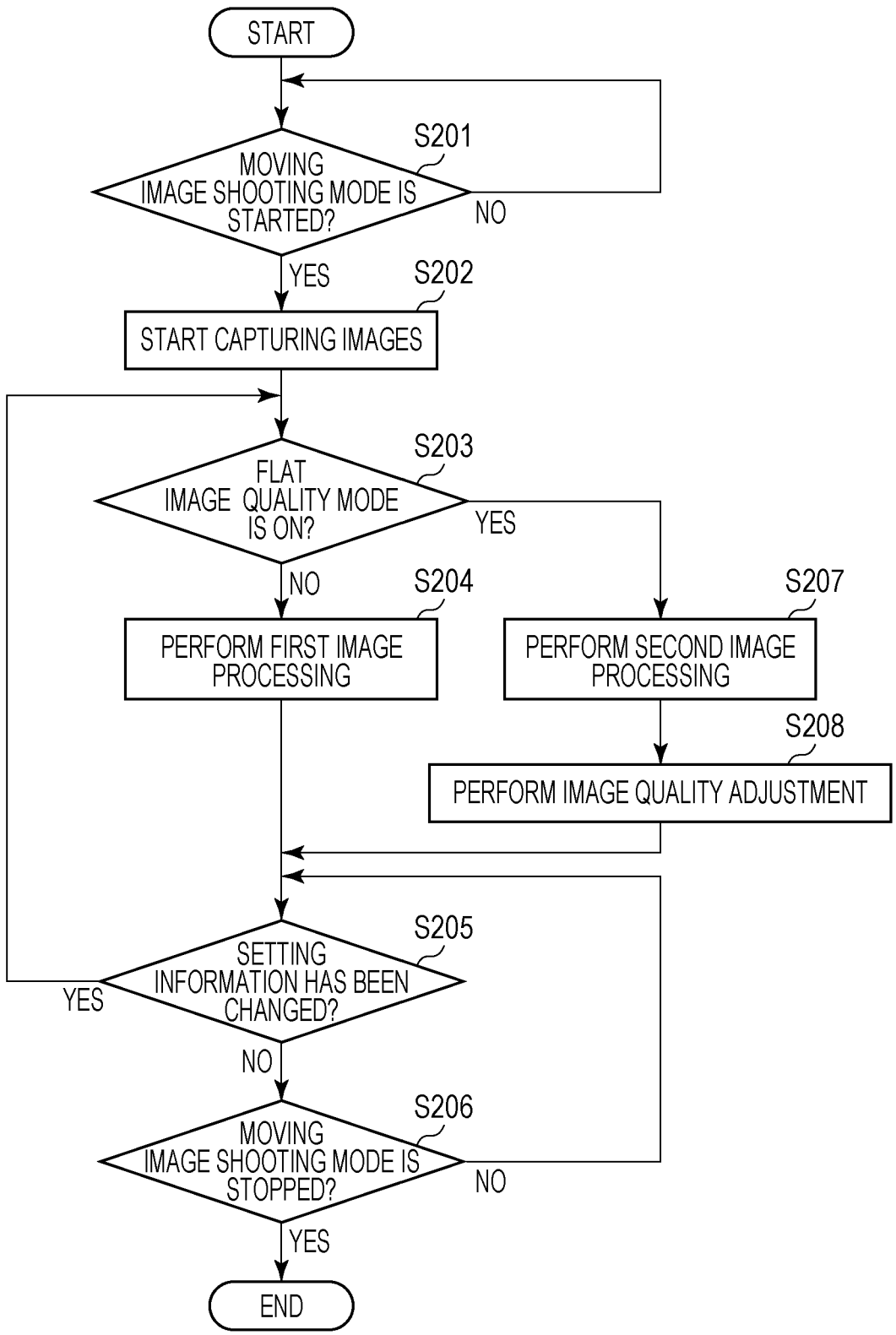
FIG. 2 is a flowchart for illustrating a moving image shooting process A1 performed in the image capture apparatus 100 according to the first exemplary embodiment.

A moving image shooting process A1 performed in the image capture apparatus 100 according to the first exemplary embodiment will be described with reference to FIG. 2. FIG. 2 is a flowchart for illustrating the moving image shooting process A1 performed in the image capture apparatus 100 according to the first exemplary embodiment. The CPU 111 controls the moving image shooting process A1 by executing the program Pg1 stored in the memory A 110.

In step S201, the CPU 111 determines whether or not an instruction to start the moving image shooting mode is received.

For example, if the power switch 112a is ON and the moving image shooting mode button 112b has been turned ON, the CPU 111 determines that the instruction to start the moving image shooting mode is received. If the instruction to start the moving image shooting mode is received, the CPU 111 proceeds from step S201 to step S202 (YES in step S201).

For example, if the power switch 112a is ON but the moving image shooting mode button 112b has not been turned ON, the CPU 111 determines that the instruction to start the moving image shooting mode is not received. If the instruction to start the moving image shooting mode is not received, the CPU 111 repeats step S201 (NO in step S201).

In step S202, the CPU 111 transmits a start capture command to the image capture unit 101. The image capture unit 101, which receives the start capture command, captures an optical image by using the lens unit 101a and the image capture device at each of the predetermined time T1 intervals. The image capture unit 101 generates RAW image data from the optical image captured by the image capture device at each of the predetermined time T1 intervals. Thus, the image capture unit 101 can generate two or more subsequent RAW image data. Each of the RAW image data generated by the image capture unit 101 is supplied from the image capture unit 101 to each of the first image processor 102 and the second image processor 103.

If the start capture command is transmitted to the image capture unit 101, the CPU 111 proceeds from step S202 to step S203.

In step S203, the CPU 111 determines whether the flat image quality mode is ON or OFF.

If the flat image quality mode is ON, the CPU 111 proceeds from step S203 to step S207 (YES in step S203).

If the flat image quality mode is OFF, the CPU 111 proceeds from step S203 to step S204 (NO in step S203).

In step S204, the CPU 111 transmits a first image processing command to the first image processor 102. The first image processor 102, which receives the first image processing command, processes each RAW image data supplied from the image capture unit 101, by using the image processing parameter information GP1. Thus, the first image processor 102 can convert each RAW image data supplied from the image capture unit 101 into standard-quality image data.

In step S204, the standard-quality image data generated by the first image processor 102 are supplied to each of the recording controller 105, the display controller 106, the HDMI controller 108, and the USB controller 109.

After the CPU 111 transmits the first image processing command to the first image processor 102, the CPU 111 proceeds from step S204 to step S205.

In step S205, the CPU 111 determines whether or not the setting information about the flat image quality mode has been changed during the moving image shooting mode.

If the setting information about the flat image quality mode has been changed during the moving image shooting mode, the CPU 111 returns back from step S205 to step S203 (YES in step S205).

If the setting information about the flat image quality mode has not been changed during the moving image shooting mode, the CPU 111 proceeds from step S205 to step S206 (NO in step S205).

In step S206, the CPU 111 determines whether or not an instruction to stop the moving image shooting mode is received.

For example, if either one of the power switch 112a and the moving image shooting mode button 112b is turned OFF, the CPU 111 determines that the instruction to stop the moving image shooting mode is received. If the instruction to stop the moving image shooting mode is received, the CPU 111 ends the moving image shooting process A1 (YES in step S206).

For example, if both of the power switch 112a and the moving image shooting mode button 112b are ON, the CPU 111 determines that the instruction to stop the moving image shooting mode is not received. If the instruction to stop the moving image shooting mode is not received, the CPU 111 returns back from step S206 to step S205 (NO in step S206).

In step S207, the CPU 111 transmits a second image processing command to the second image processor 103. The second image processor 103, which receives the second image processing command, processes each RAW image data supplied from the image capture unit 101, by using the image processing parameter information GP2. Thus, the second image processor 103 can convert each RAW image data supplied from the image capture unit 101 into flat-image-quality image data.

In step S207, the flat-image-quality image data generated by the second image processor 103 are supplied to each of the image quality adjustment unit 104, the recording controller 105, the display controller 106, the HDMI controller 108, and the USB controller 109.

After the CPU 111 transmits the second image processing command to the second image processor 103, the CPU 111 proceeds from step S207 to step S208.

In step S208, the CPU 111 transmits an image quality adjustment command to the image quality adjustment unit 104. The image quality adjustment unit 104, which receives the image quality adjustment command, adjusts the image quality of each image data supplied from the second image processor 103 so that the image quality of each image data corresponds to the predetermined image quality. Thus, the image quality adjustment unit 104 can convert each image data supplied from the second image processor 103 into image-quality-adjusted image data.

In step S208, the image-quality-adjusted image data generated by the image quality adjustment unit 104 are supplied to each of the display controller 106, the HDMI controller 108, and the USB controller 109.

After the CPU 111 transmits the image quality adjustment command to the image quality adjustment unit 104, the CPU 111 proceeds from step S208 to step S205.

Thus, if the flat image quality mode is OFF, the image capture apparatus 100 can generate the standard-quality image data at each predetermined time T1 interval. If the flat image quality mode is ON, the image capture apparatus 100 can generate the flat-image-quality image data at each predetermined time T1 interval. If the flat image quality mode is ON, the image capture apparatus 100 can generate image data, whose image quality is obtained by applying the predetermined post processing, at each predetermined time T1 interval.

Figure 3:
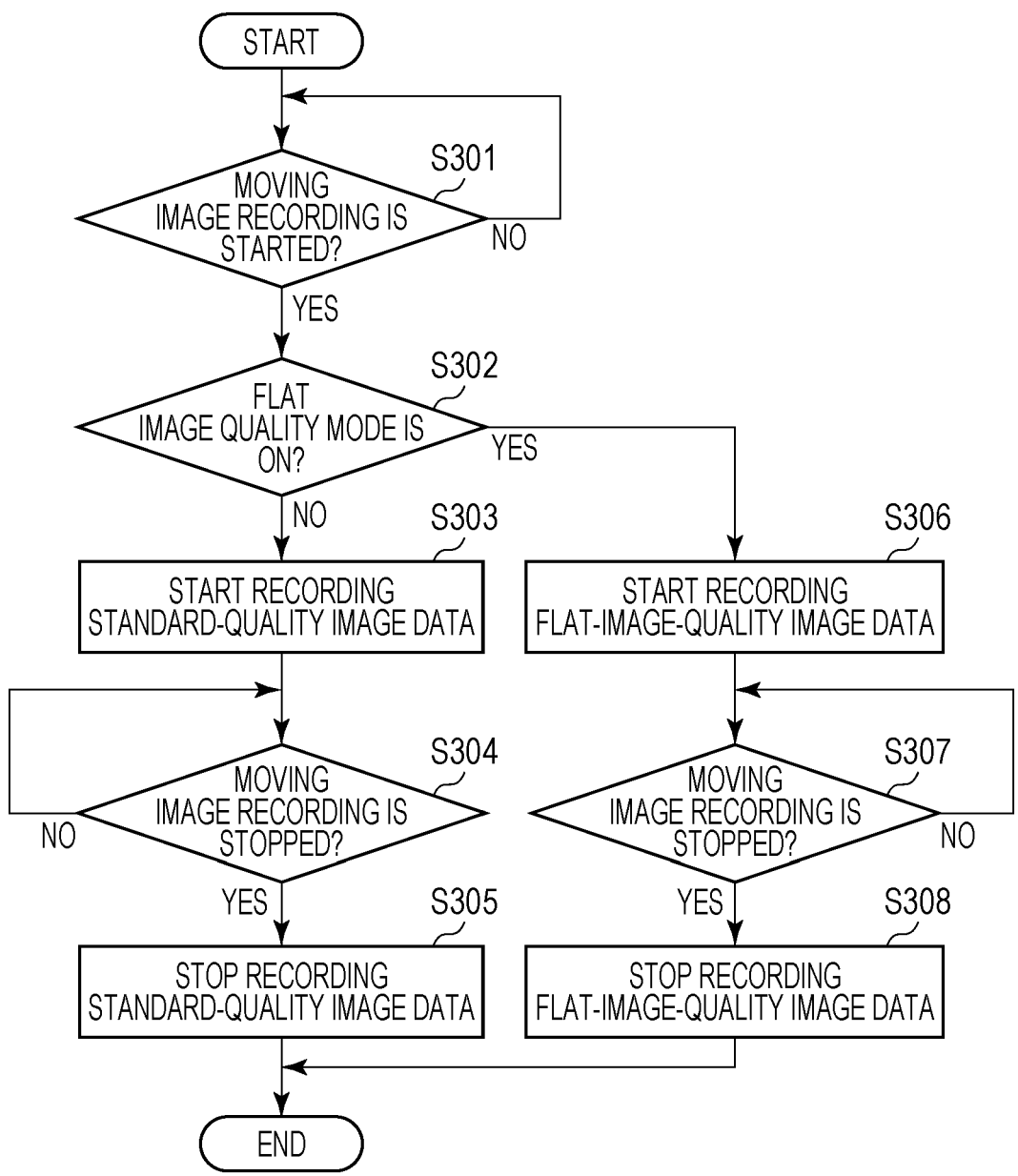
FIG. 3 is a flowchart for illustrating a moving image recording process B1 performed in the image capture apparatus 100 according to the first exemplary embodiment.

A moving image recording process B1 performed in the image capture apparatus 100 according to the first exemplary embodiment will be described with reference to FIG. 3. FIG. 3 is a flowchart for illustrating the moving image recording process B1 performed in the image capture apparatus 100 according to the first exemplary embodiment. The CPU 111 controls the moving image recording process B1 by executing the program Pg2 stored in the memory A 110.

In step S301, the CPU 111 determines whether or not an instruction to start recording of moving image is received.

For example, if the power switch 112a and the moving image shooting mode button 112b are ON and the start/stop button 112c has been turned ON, the CPU 111 determines that the instruction to start recording of moving image is received. If the instruction to start recording of moving image is received, the CPU 111 proceeds from step S301 to step S302 (YES in step S301).

For example, if the power switch 112a and the moving image shooting mode button 112b are ON but the start/stop button 112c has not been turned ON, the CPU 111 determines that the instruction to start recording of moving image is not received. If the instruction to start recording of moving image is not received, the CPU 111 repeats step S301 (NO in step S301).

In step S302, the CPU 111 determines whether the flat image quality mode is ON or OFF.

If the flat image quality mode is ON, the CPU 111 proceeds from step S302 to step S306 (YES in step S302). If the flat image quality mode is ON, the flat-image-quality image data are generated in the image capture apparatus 100 (see step S207).

If the flat image quality mode is OFF, the CPU 111 proceeds from step S302 to step S303 (NO in step S302). If the flat image quality mode is OFF, the standard-quality image data are generated in the image capture apparatus 100 (see step S204).

In step S303, the CPU 111 transmits a first start recording command to the recording controller 105. The recording controller 105, which receives the first start recording command, starts recording each image data supplied from the first image processor 102 to the recording controller 105 in the storage device 105a as moving image data. Thus, the standard-quality image data are recorded in the storage device 105a as moving image data. The image size (or horizontal and vertical resolutions) of the standard-quality image data recorded in the storage device 105a depends on the setting information about the moving image recording size.

If the first start recording command is transmitted to the recording controller 105, the CPU 111 proceeds from step S303 to step S304.

In step S304, the CPU 111 determines whether or not an instruction to stop recording of moving image is received.

For example, if either one of the power switch 112a, the moving image shooting mode button 112b, and the start/stop button 112c is turned OFF, the CPU 111 determines that the instruction to stop recording of moving image is received. If the instruction to stop recording of moving image is received, the CPU 111 proceeds from step S304 to step S305 (YES in step S304).

For example, if all of the power switch 112a, the moving image shooting mode button 112b, and the start/stop button 112c are ON, the CPU 111 determines that the instruction to stop recording of moving image is not received. If the instruction to stop recording of moving image is not received, the CPU 111 repeats step S304 (NO in step S304).

In step S305, the CPU 111 transmits a stop recording command to the recording controller 105. The recording controller 105, which receives the stop recording command, stops recording each image data supplied from the first image processor 102 to the recording controller 105 in the storage device 105a. Thus, recording of the standard-quality image data in the storage device 105a is stopped. If the recording controller 105 stops recording the standard-quality image data in the storage device 105a, the CPU 111 ends the moving image recording process B1.

In step S306, the CPU 111 transmits a second start recording command to the recording controller 105. The recording controller 105, which receives the second start recording command, starts recording each image data supplied from the second image processor 103 to the recording controller 105 in the storage device 105a as moving image data. Thus, the flat-image-quality image data are recorded in the storage device 105a as moving image data. The image size (or horizontal and vertical resolutions) of the flat-image-quality image data recorded in the storage device 105a depends on the setting information about the moving image recording size.

If the CPU 111 transmits the second start recording command to the recording controller 105, the CPU 111 proceeds from step S306 to step S307.

In step S307, the CPU 111 determines whether or not an instruction to stop recording of moving image is received.

For example, if either one of the power switch 112a, the moving image shooting mode button 112b, and the start/stop button 112c is turned OFF, the CPU 111 determines that the instruction to stop recording of moving image is received. If the instruction to stop recording of moving image is received, the CPU 111 proceeds from step S307 to step S308 (YES in step S307).

For example, if all of the power switch 112a, the moving image shooting mode button 112b, and the start/stop button 112c are ON, the CPU 111 determines that the instruction to stop recording of moving image is not received. If the instruction to stop recording of moving image is not received, the CPU 111 repeats step S307 (NO in step S307).

In step S308, the CPU 111 transmits a stop recording command to the recording controller 105. The recording controller 105, which receives the stop recording command, stops recording each image data supplied from the second image processor 103 to the recording controller 105 in the storage device 105a. Thus, recording of the flat-image-quality image data in the storage device 105a is stopped. If the recording controller 105 stops recording the flat-image-quality image data in the storage device 105a, the CPU 111 ends the moving image recording process B1.

Thus, if the flat image quality mode is OFF, the image capture apparatus 100 can record the standard-quality image data in the storage device 105a as moving image data.

If the flat image quality mode is ON, the image capture apparatus 100 can record the flat-image-quality image data in the storage device 105a as moving image data.

If the flat image quality mode is ON, the image capture apparatus 100 can record the flat-image-quality image data in the storage device 105a as moving image data regardless of whether or not the view assistance function is ON.

Figure 4:
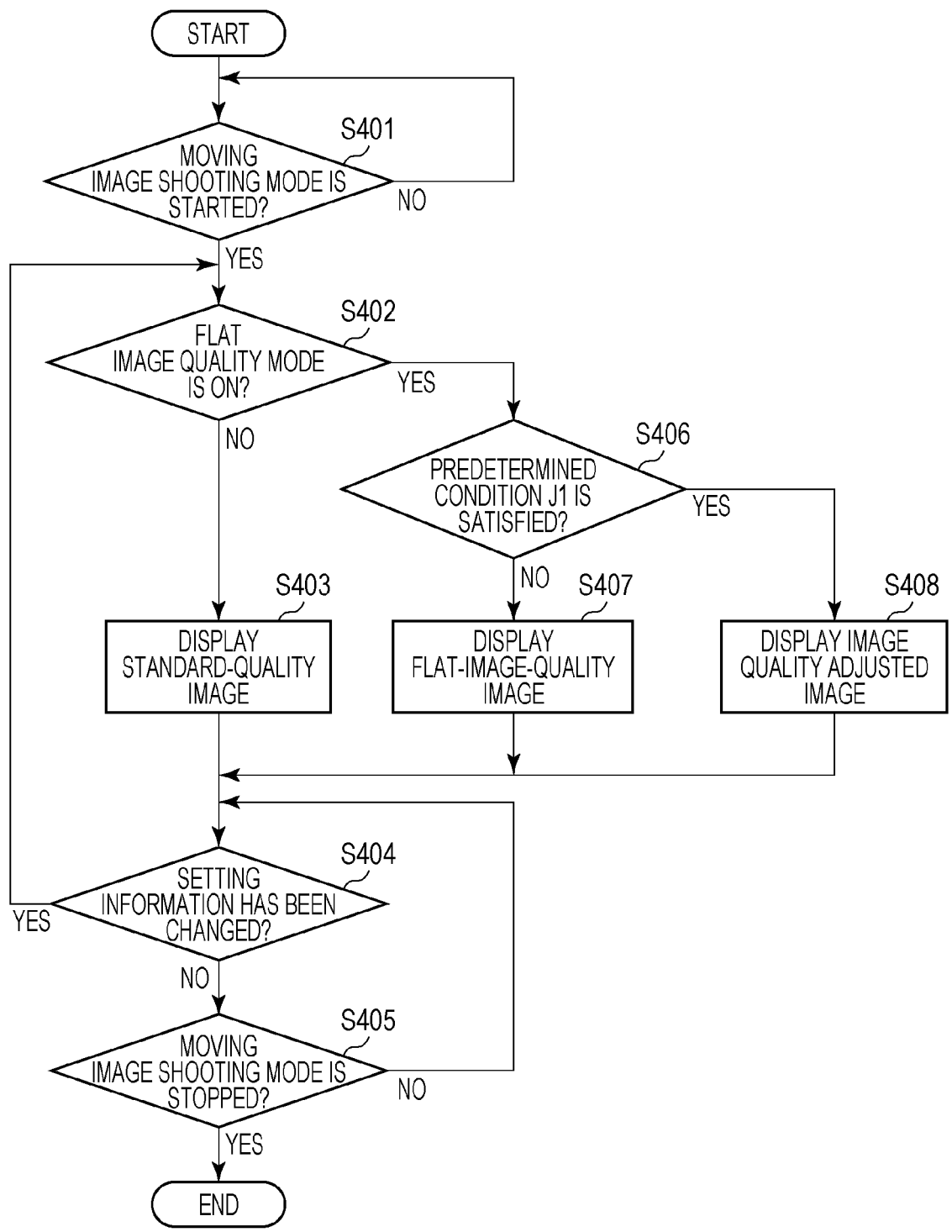
FIG. 4 is a flowchart for illustrating a moving image display process C1 performed in the image capture apparatus 100 according to the first exemplary embodiment.

A moving image display process C1 performed in the image capture apparatus 100 according to the first exemplary embodiment will be described with reference to FIG. 4. FIG. 4 is a flowchart for illustrating the moving image display process C1 performed in the image capture apparatus 100 according to the first exemplary embodiment. The CPU 111 controls the moving image display process C1 by executing the program Pg3 stored in the memory A 110.

In step S401, the CPU 111 determines whether or not an instruction to start the moving image shooting mode is received.

For example, if the power switch 112a is ON and the moving image shooting mode button 112b has been turned ON, the CPU 111 determines that the instruction to start the moving image shooting mode is received. If the instruction to start the moving image shooting mode is received, the CPU 111 proceeds from step S401 to step S402 (YES in step S401).

For example, if the power switch 112a is ON but the moving image shooting mode button 112b has not been turned ON, the CPU 111 determines that the instruction to start the moving image shooting mode is not received. If the instruction to start the moving image shooting mode is not received, the CPU 111 repeats step S401 (NO in step S401).

In step S402, the CPU 111 determines whether the flat image quality mode is ON or OFF.

If the flat image quality mode is ON, the CPU 111 proceeds from step S402 to step S406 (YES in step S402). If the flat image quality mode is ON, the flat-image-quality image data are generated in the image capture apparatus 100 (see step S207). If the flat image quality mode is ON, the image-quality-adjusted image data are also generated in the image capture apparatus 100 (see step S208).

If the flat image quality mode is OFF, the CPU 111 proceeds from step S402 to step S403 (NO in step S402). If the flat image quality mode is OFF, the standard-quality image data are generated in the image capture apparatus 100 (see step S204).

In step S403, the CPU 111 transmits a first start display command to the display controller 106. The display controller 106, which receives the first start display command, controls the display device 107 so that an image corresponding to the standard-quality image data supplied from the first image processor 102 to the display controller 106 is displayed on the display device 107. Thus, if the flat image quality mode is OFF, a moving image having standard image quality is displayed on the display device 107. Therefore, if the flat image quality mode is OFF, output image quality of the display device 107 is the standard image quality.

If the first start display command is transmitted to the display controller 106, the CPU 111 proceeds from step S403 to step S404.

In step S404, the CPU 111 determines whether or not the setting information about the flat image quality mode has been changed during the moving image shooting mode. In step S404, the CPU 111 determines whether or not the setting information about the view assistance function of the display device 107 has been changed during the moving image shooting mode.

If the setting information about the flat image quality mode has been changed during the moving image shooting mode, the CPU 111 returns back from step S404 to step S402 (YES in step S404). If the setting information about the view assistance function of the display device 107 has been changed during the moving image shooting mode, the CPU 111 also returns back from step S404 to step S402 (YES in step S404).

If the setting information about the flat image quality mode has not been changed during the moving image shooting mode, the CPU 111 proceeds from step S404 to step S405 (NO in step S404). If the setting information about the view assistance function of the display device 107 has not been changed during the moving image shooting mode, the CPU 111 also proceeds from step S404 to step S405 (NO in step S404).

In step S405, the CPU 111 determines whether or not an instruction to stop the moving image shooting mode is received.

For example, if either one of the power switch 112a and the moving image shooting mode button 112b is turned OFF, the CPU 111 determines that the instruction to stop the moving image shooting mode is received. If the instruction to stop the moving image shooting mode is received, the CPU 111 ends the moving image display process C1 (YES in step S405).

For example, if all of the power switch 112a and the moving image shooting mode button 112b are ON, the CPU 111 determines that the instruction to stop the moving image shooting mode is not received. If the instruction to stop the moving image shooting mode is not received, the CPU 111 returns back from step S405 to step S404 (NO in step S405).

In step S406, the CPU 111 determines whether or not the predetermined condition J1 is satisfied. The predetermined condition J1 indicates, for example, that the view assistance function of the display device 107 is ON.

If the view assistance function of the display device 107 is ON, the CPU 111 determines that the predetermined condition J1 is satisfied. If the predetermined condition J1 is satisfied, the CPU 111 proceeds from step S406 to step S408 (YES in step S406).

If the view assistance function of the display device 107 is OFF, the CPU 111 determines that the predetermined condition J1 is not satisfied. If the predetermined condition J1 is not satisfied, the CPU 111 proceeds from step S406 to step S407 (NO in step S406).

In step S407, the CPU 111 transmits a second start display command to the display controller 106. The display controller 106, which receives the second start display command, controls the display device 107 so that an image corresponding to the flat-image-quality image data supplied from the second image processor 103 to the display controller 106 is displayed on the display device 107. Thus, in a case where the flat image quality mode is ON but where the view assistance function of the display device 107 is OFF, a moving image having flat image quality is displayed on the display device 107. Therefore, in a case where the flat image quality mode is ON but where the view assistance function of the display device 107 is OFF, output image quality of the display device 107 is the flat image quality.

If the second start display command is transmitted to the display controller 106, the CPU 111 proceeds from step S407 to step S404.

In step S408, the CPU 111 transmits a third start display command to the display controller 106. The display controller 106, which receives the third start display command, controls the display device 107 so that an image corresponding to the image-quality-adjusted image data supplied from the image quality adjustment unit 104 to the display controller 106 are displayed on the display device 107. Thus, in a case where the flat image quality mode is ON and where the view assistance function of the display device 107 is also ON, the image quality of a moving image displayed on the display device 107 is the image quality obtained by applying the predetermined post processing. Therefore, in a case where the flat image quality mode is ON and where the view assistance function of the display device 107 is also ON, output image quality of the display device 107 is the image quality obtained by applying the predetermined post processing.

If the third start display command is transmitted to the display controller 106, the CPU 111 proceeds from step S408 to step S404.

Thus, the flat image quality mode is set to ON or OFF, and the view assistance function of the display device 107 is set to ON or OFF, whereby a user can freely change output image quality of the display device 107. Consequently, in a case where the flat-image-quality image data suitable for the predetermined post processing is generated, image data, whose image quality is obtained by applying the predetermined post processing, can be displayed on the display device 107 instead of the flat-image-quality image data.

Figure 5:
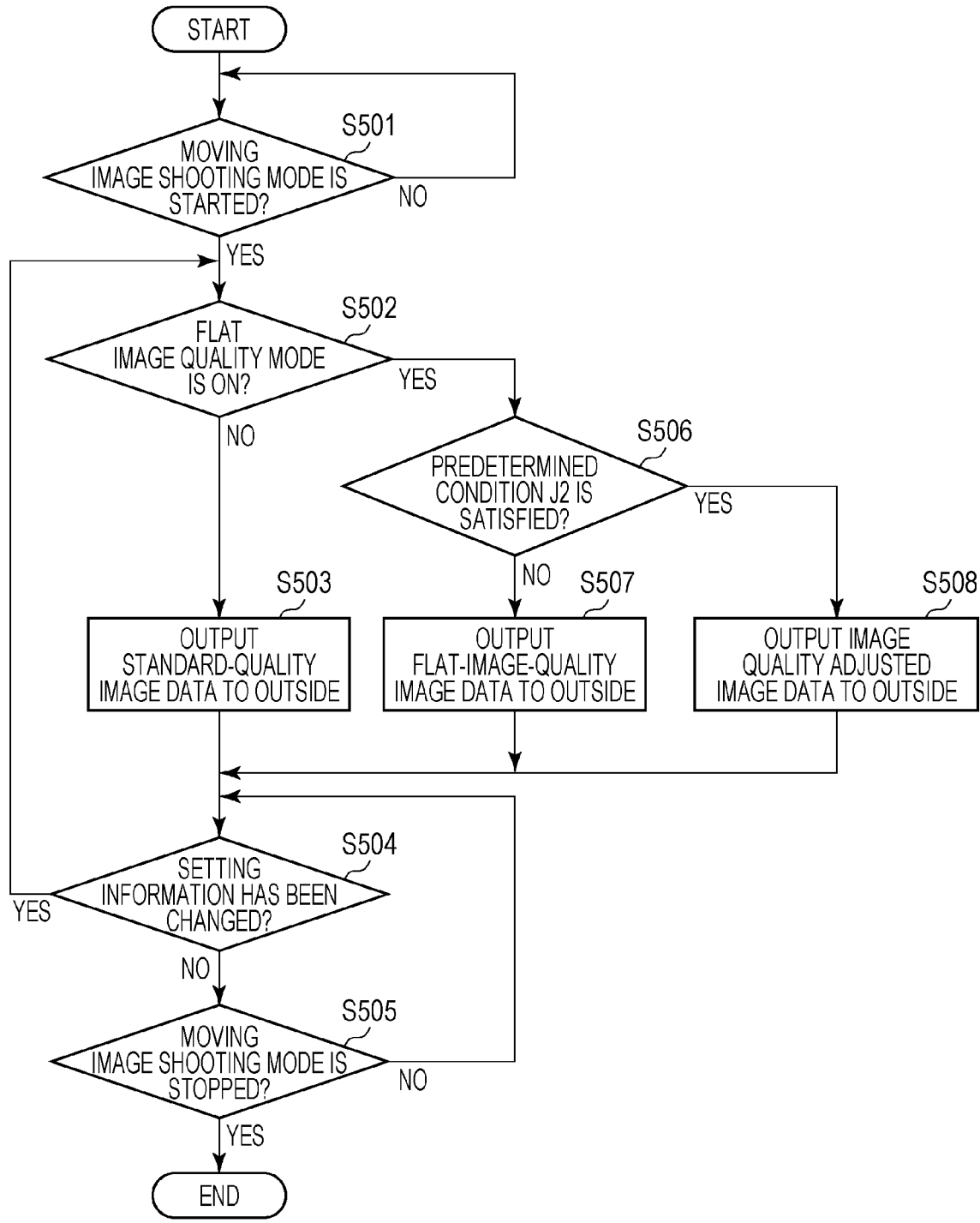
FIG. 5 is a flowchart for illustrating a moving image output process D1 performed in the image capture apparatus 100 according to the first exemplary embodiment.

A moving image output process D1 performed in the image capture apparatus 100 according to the first exemplary embodiment will be described with reference to FIG. 5. FIG. 5 is a flowchart for illustrating the moving image output process D1 performed in the image capture apparatus 100 according to the first exemplary embodiment. The CPU 111 controls the moving image output process D1 by executing the program Pg4 stored in the memory A 110.

In step S501, the CPU 111 determines whether or not an instruction to start the moving image shooting mode is received.

For example, if the power switch 112a is ON and the moving image shooting mode button 112b has been turned ON, the CPU 111 determines that the instruction to start the moving image shooting mode is received. If the instruction to start the moving image shooting mode is received, the CPU 111 proceeds from step S501 to step S502 (YES in step S501).

For example, if the power switch 112a is ON but the moving image shooting mode button 112b has not been turned ON, the CPU 111 determines that the instruction to start the moving image shooting mode is not received. If the instruction to start the moving image shooting mode is not received, the CPU 111 repeats step S501 (NO in step S501).

In step S502, the CPU 111 determines whether the flat image quality mode is ON or OFF.

If the flat image quality mode is ON, the CPU 111 proceeds from step S502 to step S506 (YES in step S502). If the flat image quality mode is ON, the flat-image-quality image data are generated in the image capture apparatus 100 (see step S207). If the flat image quality mode is ON, the image-quality-adjusted image data are also generated in the image capture apparatus 100 (see step S208).

If the flat image quality mode is OFF, the CPU 111 proceeds from step S502 to step S503 (NO in step S502). If the flat image quality mode is OFF, the standard-quality image data are generated in the image capture apparatus 100 (see step S204).

In step S503, the CPU 111 transmits a first start output command to the HDMI controller 108. The HDMI controller 108, which receives the first start output command, transmits the standard-quality image data, which is supplied from the first image processor 102 to the HDMI controller 108, to the external apparatus EX1 via the HDMI connector 108a. If the external apparatus EX1 acts as an external storage, the standard-quality image data transmitted from the HDMI controller 108 can be recorded on a recording medium of the external apparatus EX1. If the external apparatus EX1 acts as an external display, an image corresponding to the standard-quality image data transmitted from the HDMI controller 108 can be displayed on a display device of the external apparatus EX1. Thus, if the flat image quality mode is OFF, the standard-quality image data is output from the HDMI controller 108. Therefore, if the flat image quality mode is OFF, output image quality of the HDMI controller 108 is the standard image quality.

If the first start output command is transmitted to the HDMI controller 108, the CPU 111 proceeds from step S503 to step S504.

In step S504, the CPU 111 determines whether or not the setting information about the flat image quality mode has been changed during the moving image shooting mode. In step S504, the CPU 111 determines whether or not the setting information about the view assistance function of the HDMI controller 108 has been changed during the moving image shooting mode.

If the setting information about the flat image quality mode has been changed during the moving image shooting mode, the CPU 111 returns back from step S504 to step S502 (YES in step S504). If the setting information about the view assistance function of the HDMI controller 108 has been changed during the moving image shooting mode, the CPU 111 also returns back from step S504 to step S502 (YES in step S504).

If the setting information about the flat image quality mode has not been changed during the moving image shooting mode, the CPU 111 proceeds from step S504 to step S505 (NO in step S504). If the setting information about the view assistance function of the HDMI controller 108 has not been changed during the moving image shooting mode, the CPU 111 also proceeds from step S504 to step S505 (NO in step S504).

In step S505, the CPU 111 determines whether or not an instruction to stop the moving image shooting mode is received.

For example, if either one of the power switch 112a and the moving image shooting mode button 112b is turned OFF, the CPU 111 determines that the instruction to stop the moving image shooting mode is received. If the instruction to stop the moving image shooting mode is received, the CPU 111 ends the moving image output process D1 (YES in step S505).

For example, if all of the power switch 112a and the moving image shooting mode button 112b are ON, the CPU 111 determines that the instruction to stop the moving image shooting mode is not received. If the instruction to stop the moving image shooting mode is not received, the CPU 111 returns back from step S505 to step S504 (NO in step S505).

In step S506, the CPU 111 determines whether or not the predetermined condition J2 is satisfied. The predetermined condition J2 indicates, for example, that the view assistance function of the HDMI controller 108 is ON.

If the view assistance function of the HDMI controller 108 is ON, the CPU 111 determines that the predetermined condition J2 is satisfied. If the predetermined condition J2 is satisfied, the CPU 111 proceeds from step S506 to step S508 (YES in step S506).

If the view assistance function of the HDMI controller 108 is OFF, the CPU 111 determines that the predetermined condition J2 is not satisfied. If the predetermined condition J2 is not satisfied, the CPU 111 proceeds from step S506 to step S507 (NO in step S506).

In step S507, the CPU 111 transmits a second start output command to the HDMI controller 108. The HDMI controller 108, which receives the second start output command, transmits the flat-image-quality image data, which is supplied from the second image processor 103 to the HDMI controller 108, to the external apparatus EX1 via the HDMI connector 108a. If the external apparatus EX1 acts as an external storage, the flat-image-quality image data transmitted from the HDMI controller 108 can be recorded on a recording medium of the external apparatus EX1. If the external apparatus EX1 acts as an external display, an image corresponding to the flat-image-quality image data transmitted from the HDMI controller 108 can be displayed on a display device of the external apparatus EX1. Thus, in a case where the flat image quality mode is ON but where the view assistance function of the HDMI controller 108 is OFF, the flat-image-quality image data is output from the HDMI controller 108. Therefore, in a case where the flat image quality mode is ON but where the view assistance function of the HDMI controller 108 is OFF, output image quality of the HDMI controller 108 is the flat image quality.

If the second start output command is transmitted to the HDMI controller 108, the CPU 111 proceeds from step S507 to step S504.

In step S508, the CPU 111 transmits a third start output command to the HDMI controller 108. The HDMI controller 108, which receives the third start output command, transmits the image-quality-adjusted image data, which is supplied from the image quality adjustment unit 104 to the HDMI controller 108, to the external apparatus EX1 via the HDMI connector 108a. If the external apparatus EX1 acts as an external storage, the image-quality-adjusted image data transmitted from the HDMI controller 108 can be recorded on a recording medium of the external apparatus EX1. If the external apparatus EX1 acts as an external display, an image corresponding to the image-quality-adjusted image data transmitted from the HDMI controller 108 can be displayed on a display device of the external apparatus EX1. Thus, in a case where the flat image quality mode is ON and where the view assistance function of the HDMI controller 108 is also ON, the image-quality-adjusted image data is output from the HDMI controller 108. Therefore, in a case where the flat image quality mode is ON and where the view assistance function of the HDMI controller 108 is also ON, output image quality of the HDMI controller 108 is the image quality obtained by applying the predetermined post processing.

If the third start output command is transmitted to the HDMI controller 108, the CPU 111 proceeds from step S508 to step S504.

Thus, according to the first exemplary embodiment, the flat image quality mode is set to ON or OFF, and the view assistance function of the HDMI controller 108 is set to ON or OFF, whereby a user can freely change output image quality of the HDMI controller 108. For example, the HDMI controller 108 can be selected as an external output unit which outputs image data whose image quality is obtained by applying the predetermined post processing. Consequently, even in a case where the flat-image-quality image data suitable for the predetermined post processing is generated, image data, whose image quality is obtained by applying the predetermined post processing, can be output from the HDMI controller 108.

Figure 7:
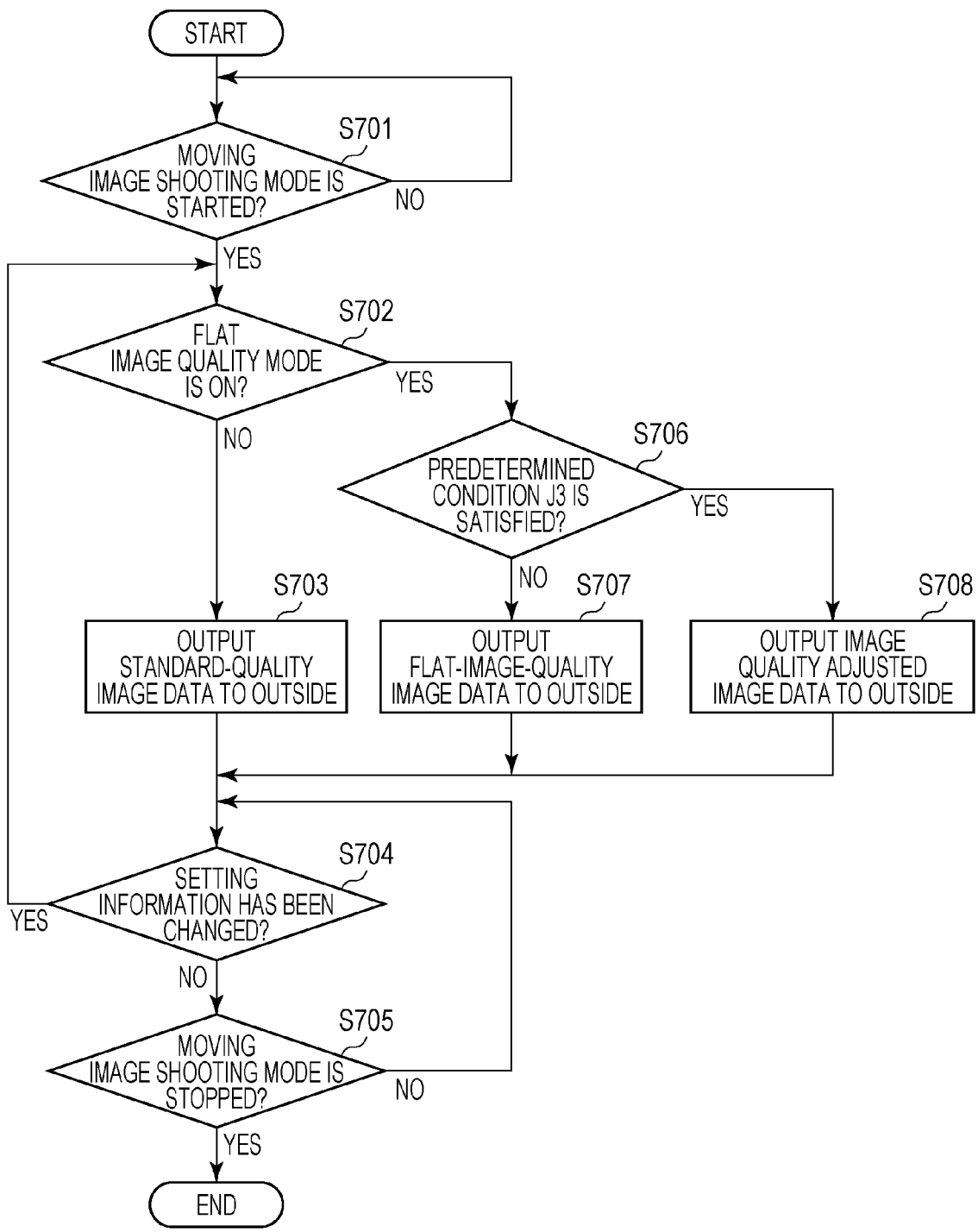
FIG. 7 is a flowchart for illustrating a moving image output process D2 performed in the image capture apparatus 100 according to the first exemplary embodiment.

A moving image output process D2 performed in the image capture apparatus 100 according to the first exemplary embodiment will be described with reference to FIG. 7. FIG. 7 is a flowchart for illustrating the moving image output process D2 performed in the image capture apparatus 100 according to the first exemplary embodiment. The CPU 111 controls the moving image output process D2 by executing the program Pg5 stored in the memory A 110.

In step S701, the CPU 111 determines whether or not an instruction to start the moving image shooting mode is received.

For example, if the power switch 112a is ON and the moving image shooting mode button 112b has been turned ON, the CPU 111 determines that the instruction to start the moving image shooting mode is received. If the instruction to start the moving image shooting mode is received, the CPU 111 proceeds from step S701 to step S702 (YES in step S701).

For example, if the power switch 112a is ON but the moving image shooting mode button 112b has not been turned ON, the CPU 111 determines that the instruction to start the moving image shooting mode is not received. If the instruction to start the moving image shooting mode is not received, the CPU 111 repeats step S701 (NO in step S701).

In step S702, the CPU 111 determines whether the flat image quality mode is ON or OFF.

If the flat image quality mode is ON, the CPU 111 proceeds from step S702 to step S706 (YES in step S702). If the flat image quality mode is ON, the flat-image-quality image data are generated in the image capture apparatus 100.

If the flat image quality mode is OFF, the CPU 111 proceeds from step S702 to step S703 (NO in step S702). If the flat image quality mode is OFF, the standard-quality image data are generated in the image capture apparatus 100.

In step S703, the CPU 111 transmits a fourth start output command to the USB controller 109. The USB controller 109, which receives the fourth start output command, transmits the standard-quality image data, which is supplied from the first image processor 102 to the USB controller 109, to the external apparatus EX2 via the USB connector 109a. If the external apparatus EX2 acts as an external storage, the standard-quality image data transmitted from the USB controller 109 can be recorded on a recording medium of the external apparatus EX2. If the external apparatus EX2 acts as an external display, an image corresponding to the standard-quality image data transmitted from the USB controller 109 can be displayed on a display device of the external apparatus EX2. Thus, if the flat image quality mode is OFF, the standard-quality image data is output from the USB controller 109. Therefore, if the flat image quality mode is OFF, output image quality of the USB controller 109 is the standard image quality.

If the fourth start output command is transmitted to the USB controller 109, the CPU 111 proceeds from step S703 to step S704.

In step S704, the CPU 111 determines whether or not the setting information about the flat image quality mode has been changed during the moving image shooting mode. In step S704, the CPU 111 determines whether or not the setting information about the view assistance function of the USB controller 109 has been changed during the moving image shooting mode.

If the setting information about the flat image quality mode has been changed during the moving image shooting mode, the CPU 111 returns back from step S704 to step S702 (YES in step S704). If the setting information about the view assistance function of the USB controller 109 has been changed during the moving image shooting mode, the CPU 111 also returns back from step S704 to step S702 (YES in step S704).

If the setting information about the flat image quality mode has not been changed during the moving image shooting mode, the CPU 111 proceeds from step S704 to step S705 (NO in step S704). If the setting information about the view assistance function of the USB controller 109 has not been changed during the moving image shooting mode, the CPU 111 also proceeds from step S704 to step S705 (NO in step S704).

In step S705, the CPU 111 determines whether or not an instruction to stop the moving image shooting mode is received.

For example, if either one of the power switch 112a and the moving image shooting mode button 112b is turned OFF, the CPU 111 determines that the instruction to stop the moving image shooting mode is received. If the instruction to stop the moving image shooting mode is received, the CPU 111 ends the moving image output process D2 (YES in step S705).

For example, if all of the power switch 112a and the moving image shooting mode button 112b are ON, the CPU 111 determines that the instruction to stop the moving image shooting mode is not received. If the instruction to stop the moving image shooting mode is not received, the CPU 111 returns back from step S705 to step S704 (NO in step S705).

In step S706, the CPU 111 determines whether or not the predetermined condition J3 is satisfied. The predetermined condition J3 indicates, for example, that the view assistance function of the USB controller 109 is ON.

If the view assistance function of the USB controller 109 is ON, the CPU 111 determines that the predetermined condition J3 is satisfied. If the predetermined condition J3 is satisfied, the CPU 111 proceeds from step S706 to step S708 (YES in step S706).

If the view assistance function of the USB controller 109 is OFF, the CPU 111 determines that the predetermined condition J3 is not satisfied. If the predetermined condition J3 is not satisfied, the CPU 111 proceeds from step S706 to step S707 (NO in step S706).

In step S707, the CPU 111 transmits a fifth start output command to the USB controller 109. The USB controller 109, which receives the fifth start output command, transmits the flat-image-quality image data, which is supplied from the second image processor 103 to the USB controller 109, to the external apparatus EX2 via the USB connector 109a. If the external apparatus EX2 acts as an external storage, the flat-image-quality image data transmitted from the USB controller 109 can be recorded on a recording medium of the external apparatus EX2. If the external apparatus EX2 acts as an external display, an image corresponding to the flat-image-quality image data transmitted from the USB controller 109 can be displayed on a display device of the external apparatus EX2. Thus, in a case where the flat image quality mode is ON but where the view assistance function of the USB controller 109 is OFF, the flat-image-quality image data is output from the USB controller 109. Therefore, in a case where the flat image quality mode is ON but where the view assistance function of the USB controller 109 is OFF, output image quality of the USB controller 109 is the flat image quality.

If the fifth start output command is transmitted to the USB controller 109, the CPU 111 proceeds from step S707 to step S704.

In step S708, the CPU 111 transmits a sixth start output command to the USB controller 109. The USB controller 109, which receives the sixth start output command, transmits the image-quality-adjusted image data, which is supplied from the image quality adjustment unit 104 to the USB controller 109, to the external apparatus EX2 via the USB connector 109a. If the external apparatus EX2 acts as an external storage, the image-quality-adjusted image data transmitted from the USB controller 109 can be recorded on a recording medium of the external apparatus EX2. If the external apparatus EX2 acts as an external display, an image corresponding to the image-quality-adjusted image data transmitted from the USB controller 109 can be displayed on a display device of the external apparatus EX2. Thus, in a case where the flat image quality mode is ON and where the view assistance function of the USB controller 109 is also ON, the image-quality-adjusted image data is output from the USB controller 109. Therefore, in a case where the flat image quality mode is ON and where the view assistance function of the USB controller 109 is also ON, output image quality of the USB controller 109 is the image quality obtained by applying the predetermined post processing.

If the sixth start output command is transmitted to the USB controller 109, the CPU 111 proceeds from step S708 to step S704.

Thus, according to the first exemplary embodiment, the flat image quality mode is set to ON or OFF, and the view assistance function of the USB controller 109 is set to ON or OFF, whereby a user can freely change output image quality of the USB controller 109. For example, the USB controller 109 can be selected as an external output unit which outputs image data whose image quality is obtained by applying the predetermined post processing. Consequently, even in a case where the flat-image-quality image data suitable for the predetermined post processing is generated, image data, whose image quality is obtained by applying the predetermined post processing, can be output from the USB controller 109.

Various changes may be made to the first exemplary embodiment. For example, the predetermined condition J2 used in the moving image output process D1 may be changed to a condition that the view assistance function of the display device 107 is ON. In this case, the predetermined condition J2 used in the moving image output process D1 is the same as the predetermined condition J1 used in the moving image recording process B1.

For example, the predetermined condition J2 used in the moving image output process D1 may be changed to a condition that the view assistance function of the HDMI controller 108 is ON and that the external output size of the HDMI controller 108 is equal to or more than a predetermined image size. The predetermined image size may be, for example, "1920×1080", but is not limited to this.

For example, the predetermined condition J2 used in the moving image output process D1 may be changed to a condition that the view assistance function of the HDMI controller 108 is ON and that the external output size of the HDMI controller 108 is less than the moving image recording size. For example, the CPU 111 determines that the predetermined condition J2 is satisfied if the following conditions are satisfied: the view assistance function of the HDMI controller 108 is ON; the external output size of the HDMI controller 108 is "1920×1080"; and the moving image recording size is "4096×2160". In addition, for example, if the moving image recording size is equal to the external output size of the HDMI controller 108, the CPU 111 determines that the predetermined condition J2 is not satisfied.

For example, the predetermined condition J2 used in the moving image output process D1 may be changed to a condition that the view assistance function of the HDMI controller 108 is ON and that the shooting information adding function is ON. If the shooting information adding function is ON, the HDMI controller 108 superimposes predetermined shooting information on image data that is to be output from the HDMI controller 108. If the shooting information adding function is OFF, the HDMI controller 108 does not superimpose the predetermined shooting information on image data that is to be output from the HDMI controller 108.

The predetermined condition J2 used in the moving image output process D1 may be a condition selected from various conditions by a user.

For example, the predetermined condition J3 used in the moving image output process D2 may be changed to a condition that the view assistance function of the display device 107 is ON. In this case, the predetermined condition J3 used in the moving image output process D2 is the same as the predetermined condition J1 used in the moving image display process C1 (see step S406).

For example, the predetermined condition J3 used in the moving image output process D2 may be changed to a condition that the view assistance function of the USB controller 109 is ON and that the external output size of the USB controller 109 is equal to or more than a predetermined image size. The predetermined image size may be, for example, "1920×1080", but is not limited to this.

For example, the predetermined condition J3 used in the moving image output process D2 may be changed to a condition that the view assistance function of the USB controller 109 is ON and that the external output size of the USB controller 109 is less than the moving image recording size. For example, the CPU 111 determines that the predetermined condition J3 is satisfied if the following conditions are satisfied: the view assistance function of the USB controller 109 is ON; the external output size of the USB controller 109 is "1920×1080"; and the moving image recording size is "4096×2160". In addition, for example, if the moving image recording size is equal to the external output size of the USB controller 109, the CPU 111 determines that the predetermined condition J3 is not satisfied.

For example, the predetermined condition J3 used in the moving image output process D2 may be changed to a condition that the view assistance function of the USB controller 109 is ON and that the shooting information adding function is ON. If the shooting information adding function is ON, the USB controller 109 superimposes predetermined shooting information on image data that is to be output from the USB controller 109. If the shooting information adding function is OFF, the USB controller 109 does not superimpose the predetermined shooting information on image data that is to be output from the USB controller 109.

The predetermined condition J3 used in the moving image output process D2 may be a condition selected from various conditions by a user.

For example, the first exemplary embodiment may have a configuration in which the predetermined condition J3 is the same as the predetermined condition J2. In addition, for example, the first exemplary embodiment may have a configuration in which the predetermined condition J3 is also changed to match the predetermined condition J2 if the predetermined condition J2 is changed as described above.

The predetermined condition J1 used in the moving image display process C1 may be changed to a condition that the view assistance function of the HDMI controller 108 is ON. In this case, the predetermined condition J1 used in the moving image display process C1 is the same as the predetermined condition J2 used in the moving image output process D1.

The predetermined condition J1 used in the moving image display process C1 may be changed to a condition that the view assistance function of the USB controller 109 is ON. In this case, the predetermined condition J1 used in the moving image display process C1 is the same as the predetermined condition J3 used in the moving image output process D2.

The predetermined condition J1 used in the moving image display process C1 may be changed to a condition that all of the view assistance functions of the HDMI controller 108 and the USB controller 109 are ON.

The predetermined condition J1 used in the moving image display process C1 may be a condition selected from various conditions by a user.

For example, the first exemplary embodiment may have a configuration in which the predetermined condition J1 is the same as the predetermined condition J2. In addition, for example, the first exemplary embodiment may have a configuration in which the predetermined condition J1 is also changed to match the predetermined condition J2 if the predetermined condition J2 is changed as described above.

For example, the first exemplary embodiment may have a configuration in which the predetermined condition J1 is the same as the predetermined condition J3. In addition, for example, the first exemplary embodiment may have a configuration in which the predetermined condition J1 is also changed to match the predetermined condition J3 if the predetermined condition J3 is changed as described above.

In the first exemplary embodiment, the case where the image capture apparatus 100 has the HDMI controller 108 and the USB controller 109 is described. However, external output units included in the image capture apparatus 100 are not limited to these. For example, the HDMI controller 108 or the USB controller 109 may be changed to an external output unit based on at least one of the SDI (Serial Digital Interface) standard, the DisplayPort standard, and the Thunderbolt standard. In addition, for example, the HDMI controller 108 or the USB controller 109 may be changed to an external output unit based on at least one of the wired LAN standards and the wireless LAN standards. Needless to say, an external output unit based on a standard other than these standards may be used instead of the HDMI controller 108 or the USB controller 109.

In the first exemplary embodiment, the HDMI controller 108 or the USB controller 109 may be changed to an external output unit which outputs an analog video signal. In this case, the standard-quality or the flat-image-quality image data is output as the analog video signal.

In the first exemplary embodiment, the number of external output units included in the image capture apparatus 100 is not limited to four, and may be at least one.

Second Exemplary Embodiment

Various functions and processes described in the first exemplary embodiment can be achieved with a personal computer, a microcomputer, a CPU (Central Processing Unit), or the like using a program. Hereinafter, the personal computer, the microcomputer, the CPU, or the like is called a "computer X" in the second exemplary embodiment. In the second exemplary embodiment, a program for controlling the computer X and for achieving the various functions and processes described in the first exemplary embodiment is called a "program Y".

The various functions and processes described in the first exemplary embodiment are performed with the computer X executing the program Y. In this case, the program Y is supplied to the computer X through a computer-readable storage medium. The computer-readable storage medium in the second exemplary embodiment includes at least one of a hard disk drive, an optical disk, a CD-ROM, a CD-R, a memory card, a ROM, a RAM, and the like. In addition, the computer-readable storage medium in the second exemplary embodiment is a non-transitory storage medium.

While the present invention has been described with reference to exemplary embodiments, it is to be understood that the present invention is not limited to the exemplary embodiments. The scope of the following claims is to be accorded the broadest interpretation so as to encompass all modifications and equivalent structures.

What is claimed is:

1. An image capture apparatus comprising:
    an image capture unit that generates first image data using an image capture device;
    an image processing unit that generates second image data from the first image data so that an image quality of the second image data corresponds to a first image quality corresponding to a flat image quality;
    an image quality adjusting unit that converts the second image data into third image data by adjusting the image quality of the second image data to be a second image quality different from the first image quality, the second image quality depending upon a post processing that is selected from multiple types of post processing by a user; and
    an output unit that outputs the third image data from the image capture apparatus to an external apparatus instead of the second image data when a predetermined condition is satisfied.

2. The image capture apparatus according to claim 1, further comprising:
    a display control unit that causes a display device to display an image corresponding to the third image data instead of an image corresponding to the second image data when a second condition is satisfied.

3. The image capture apparatus according to claim 2, wherein the second condition is equal to the predetermined condition.

4. The image capture apparatus according to claim 2, wherein the second condition is different from the predetermined condition.

5. The image capture apparatus according to claim 2, wherein the second condition is a user settable condition.

6. The image capture apparatus according to claim 2, wherein when the second condition is not satisfied, the display control unit causes the display device to display the image corresponding to the second image data instead of the image corresponding to the third image data.

7. The image capture apparatus according to claim 1, further comprising:
    a second output unit that outputs the third image data from the image capture apparatus to a second external apparatus instead of the second image data when a third condition is satisfied.

8. The image capture apparatus according to claim 7, wherein the third condition is equal to the predetermined condition.

9. The image capture apparatus according to claim 7, wherein the third condition is different from the predetermined condition.

10. The image capture apparatus according to claim 7, wherein the third condition is a user settable condition.

11. The image capture apparatus according to claim 7, wherein when the third condition is not satisfied, the second output unit outputs the second image data from the image capture apparatus to the second external apparatus instead of the third image data.

12. The image capture apparatus according to claim 1, wherein the predetermined condition is a user settable condition.

13. The image capture apparatus according to claim 1, wherein when the predetermined condition is not satisfied, the output unit outputs the second image data from the image capture apparatus to the external apparatus instead of the third image data.

14. The image capture apparatus according to claim 1, further comprising:

a recording control unit that records the second image data on a recording medium.

15. A method comprising:

generating first image data using an image capture device;

generating second image data from the first image data so that an image quality of the second image data corresponds to a first image quality corresponding to a flat image quality;

converting the second image data into third image data by adjusting the image quality of the second image data to be a second image quality different from the first image quality, the second image quality depending upon post processing that is selected from multiple types of post processing by a user; and outputting the third image data from an image capture apparatus to an external apparatus instead of the second image data when a predetermined condition is satisfied.

16. The method according to claim 15, further comprising:

causing a display device to display an image corresponding to the third image data instead of an image corresponding to the second image data when a second condition is satisfied.

17. The method according to claim 16, wherein the second condition is equal to the predetermined condition.

18. The method according to claim 16, wherein the second condition is different from the predetermined condition.

19. The method according to claim 16, wherein the second condition is a user settable condition.

20. The method according to claim 16, wherein when the second condition is not satisfied, the image corresponding to the second image data is displayed on the display device instead of the image corresponding to the third image data.

21. The method according to claim 15, further comprising:

outputting the third image data from the image capture device to a second external apparatus instead of the second image data when a third condition is satisfied.

22. The method according to claim 21, wherein the third condition is equal to the predetermined condition.

23. The method according to claim 21, wherein the third condition is different from the predetermined condition.

24. The method according to claim 21, wherein the third condition is a user settable condition.

25. The method according to claim 21, wherein when the third condition is not satisfied, the second image data is outputted from the image capture apparatus to the second external apparatus instead of the third image data.

26. The method according to claim 15, wherein the predetermined condition is a user settable condition.

27. The method according to claim 15, wherein when the predetermined condition is not satisfied, the second image data is outputted from the image capture apparatus to the external apparatus instead of the third image data.

28. The method according to claim 15, further comprising:

recording the second image data on a recording medium.

29. A non-transitory storage medium that stores a program for causing a computer to execute a method, the method comprising:

generating first image data using an image capture device;

generating second image data from the first image data so that an image quality of the second image data corresponds to a first image quality corresponding to a flat image quality;

converting the second image data into third image data by adjusting the image quality of the second image data to be a second image quality different from the first image quality, the second image quality depending upon post processing that is selected from multiple types of post processing by a user; and outputting the third image data from an image capture apparatus to an external apparatus instead of the second image data when a predetermined condition is satisfied.

* * * * *